INVENTOR.
EARL J. SHELTON Jr.
BY Wade Koontz and
Martin J. Finnegan
ATTORNEYS

INVENTOR.
EARL J. SHELTON Jr.
BY Wade Koontz and
Martin J. Finnegan
ATTORNEYS

Dec. 19, 1961 E. J. SHELTON, JR 3,014,152

MAGNETRON MODE LOADING

Filed Dec. 5, 1957 3 Sheets-Sheet 3

INVENTOR.
EARL J. SHELTON Jr.
BY Wade Koontz and
Martin J. Finnegan
ATTORNEYS

United States Patent Office 3,014,152

Patented Dec. 19, 1961

3,014,152

MAGNETRON MODE LOADING

Earl J. Shelton, Jr., Needham, Mass., assignor to the United States of America as represented by the Secretary of the Air Force Filed Dec. 5, 1957, Ser. No. 700,923
1 Claim. (Cl. 315—39.61)

This invention relates to high frequency oscillators of the magnetron type, and more particularly to the control of magnetron output. The invention is directed to methods and means for reducing the incidence of unwanted frequencies, or modes of oscillation, in the operation of a magnetron.

In oscillators of the type considered here, known as plural cavity magnetrons, there is commonly an incidental generation of undesired frequencies or modes of oscillation accompanying the generation of the desired frequency or mode of oscillation as, for example, the pi-mode. This incidental generation of other modes causes a lowering of the efficiency, and a somewhat erratic functioning, of the magnetron.

Where the magnetron is equipped with tuning pins, or "plungers" movable axially of the cavity array to achieve the desired output frequency, the incidence of operation at unwanted frequencies, or "modes" of oscillation, may be reduced by loading the modes immediately adjacent the desired (pi) mode—that is, introducing power losses that assert themselves at other frequencies. It is desirable to do such loading internally, rather than externally, of the cavities, since external conditions are subject to change whereas the internal structure remains fixed.

An object of the invention, therefore, is to provide a tuning structure which will favor operation in the desired mode by minimizing loading at said desired mode, while facilitating creation of a loading effect for adjacent modes.

More specifically stated, the invention provides magnetron tuning structure wherein each cavity-entering tuning element has variable conductivity characteristics, with the extreme portion of each tuning element composed of a metal of high conductivity (preferably copper) along the region embraced by the cavity-defining vanes, while the portions of the tuning elements that are disposed beyond the cavity level are of semi-conductive, high-loss material, such as "cermet," "ferroxcube," or any of the ferromagnetic or ferroelectric compositions.

Other objects and characteristics of the invention will appear upon reference to the following detailed description of the embodiments illustrated in the accompanying drawings wherein:

FIG. 1 is an elevation view, partly sectioned (and with certain interior parts broken away or omitted, for greater clarity) of an electron discharge device embodying the invention, said device being a plural-cavity magnetron with an externally adjustable tuning structure including individual tuning fingers equal in number to the number of cavities of the magnetron, said fingers having their extremities within the respective cavities, and having their upper ends secured to a common supporting ring disposed above and beyond the cavity region of the magnetron;

Figure 1:
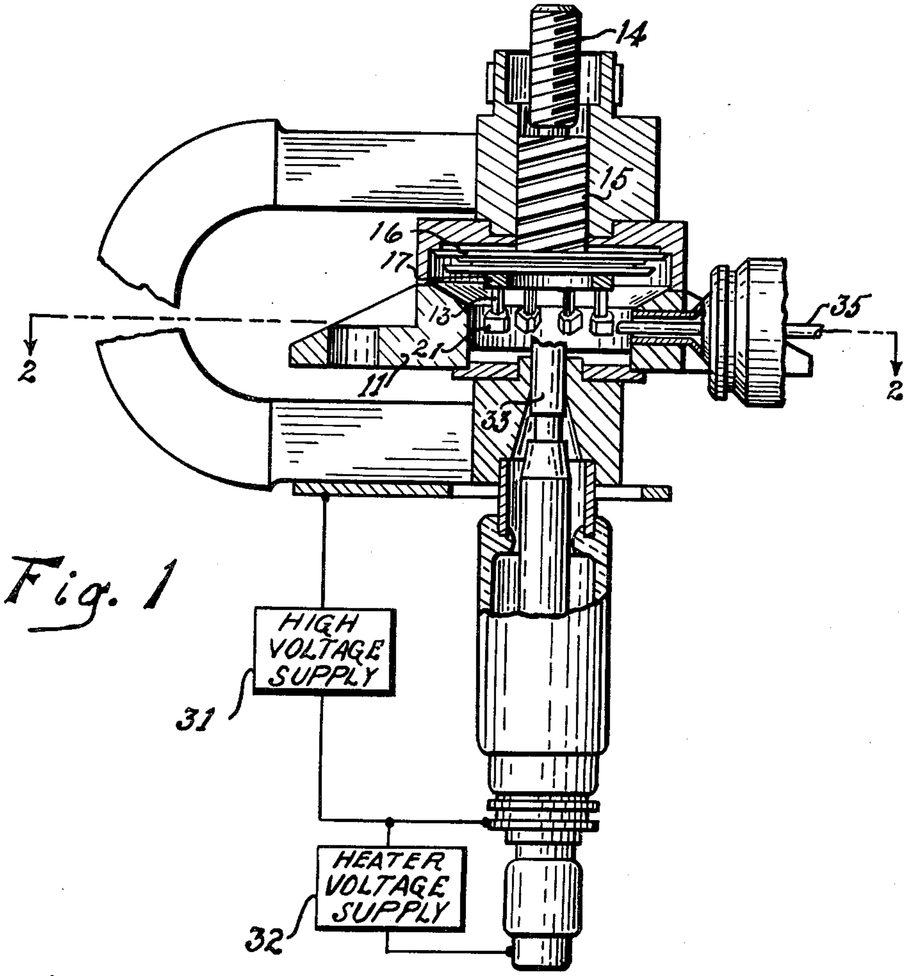
Figure 2:
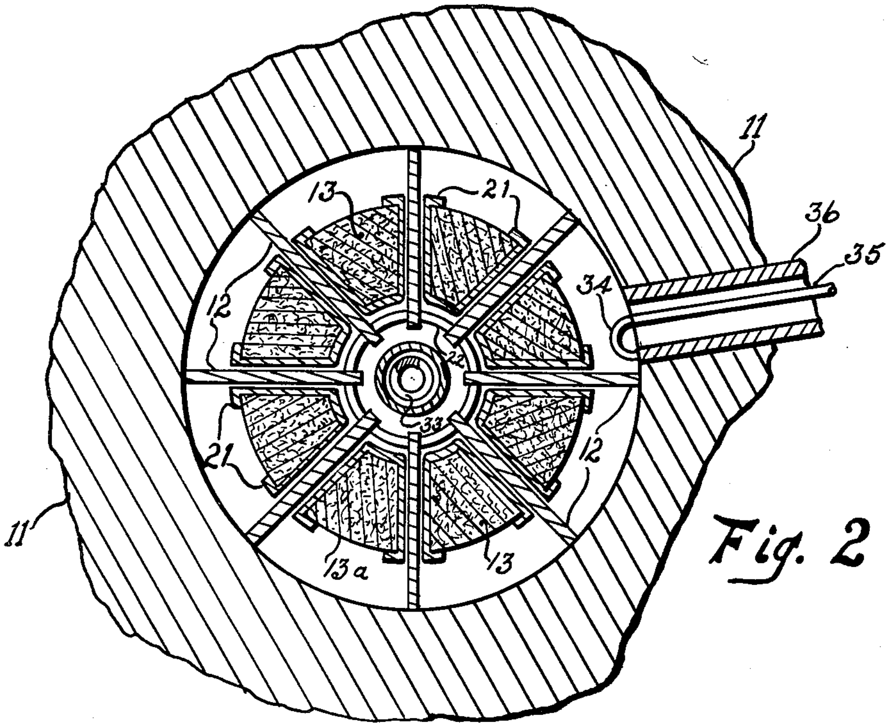
FIG. 2 is a transverse sectional view, along line 2—2, of the magnetron illustrated in FIG. 1.
Figure 3:
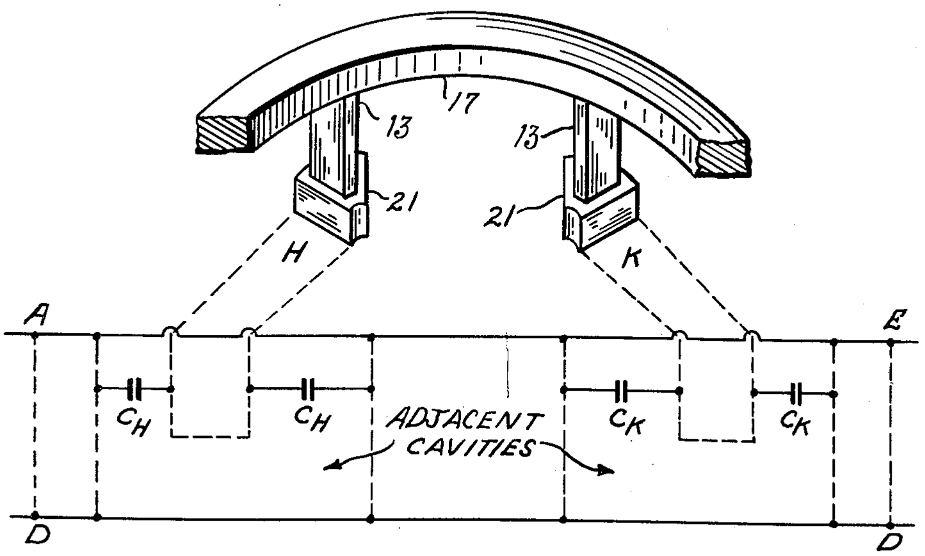

Referring first to FIGS. 1 and 2, there is shown a magnetron having conventional cathode input and anode output circuitry, as indicated at 31 to 36, inclusive, and a conventional anode block 11, centrally apertured, and equipped with radially intruding vanes 12 defining resonant cavities into which tuning elements 13 extend to a depth determined by the degree of rotation imparted to externally projecting screw element 14, which rotation is translated into linear, reciprocal motion by the interaction of the inter-engaged screw threads of elements 14 and 15, the latter having its lower end (not shown) secured to the base of sealing bellows 16. The bellows base also carries the ring 17 from which the tuning elements 13 depend. As indicated best in FIG. 2, these tuning elements 13 are principally composed of "cermet" or other semi-conductive, high-loss material, and have a transverse section of approximately trapezoidal contour, which contour is enlarged, at the cavity-entering extremities of the elements, by the addition of highly conductive metallic jackets 21, of copper or the like, extending about three sides of the elements, with the edges of each jacket 21 clamped against the arcuate outer surface of the associated element 13, leaving exposed arcuate areas of the elements 13 for inductance coupling with the respective adjacent arcuate surfaces of the anode block 11, constituting an outer wall for each successive cavity. The radially disposed sides of each jacket 21 are in close proximity to the surfaces of vanes 12, for capacitance coupling therewith, which coupling (being confined to the lower extremities of the tuning elements 13) tends to promote efficient operation of the magnetron in the preferred (pi) mode. This "mode locking" effect is due to the two-fold action that results from imparting both semi-conductive and highly conductive qualities to longitudinally spaced parts of the tuning elements 13, whereby the semi-conductive (high loss) upper portion of each tuning element tends to promote mode loading at those frequencies which are adjacent the preferred mode, while the highly conductive lower portion 21 of each element tends to promote mode locking by minimizing the loading during operation at the preferred frequency (designated the "pi" mode). This can be explained with the assistance of the diagrams of FIGS. 3 and 4 as follows:

Consider the inductive-capacitance tuning arrangement constituted by the relationship between tuning elements 13 and the respective cavity resonators bounded by vanes 12 and segments of anode wall 11, which resonators receive the extremities 21 of said elements 13. If the capacitances were all perfectly balanced, all tuners 13 would be at the same R.F. potential at any given instant so that there would be no circulating current between tuner fingers through the physical structure (ring 17—see FIG. 3) which connects tuner fingers. There would therefore be very little reduction in $Q_U$ (internal circuit "quality," or efficiency) associated with this tuning system. However, in practice, the capacitances are not perfectly balanced and some Q reduction is observed.

Now consider the situation in the adjacent mode for the same physical arrangement. It is well established that a phase shift exists along the strap (shown at 22 in FIG. 2) in all modes other than the pi-mode. This phase shift results in a change in amplitude of voltages and circulating currents from cavity to cavity. There is now an unbalanced setup which puts the tuning fingers at different R.F. voltages from cavity to cavity, so that there will be a current flow from finger to finger through the supporting structure, by way of the connecting ring 17, as indicated schematically in FIG. 3.

This is additional current flow as a result of the tuning structure, as compared to the pi-mode. It would therefore be expected that the $Q_U$ of the adjacent mode would suffer more from the tuning than that of the pi-mode. Evidence that this is the case has been obtained by measurements during actual operation, as indicated in the table below:

| Mode | $Q_U$ | | Ratio |
|---|---|---|---|
| | High End of Range | Low End of Range | |
| Pi-mode | 1,000 | 650 | .65 |
| Adjacent mode #1 | 770 | 250 | .32 |
| Adjacent mode #2 | 710 | 250 | .35 |

As indicated by these measurements, the $Q_U$ of the pi-mode was reduced to two thirds the original value whole the $Q_U$'s of the adjacent modes were reduced to one third of their original values.

It is believed that this situation can be accentuated and put to use in fixed frequency as well as tunable tubes to load the adjacent mode to a point that will favor pi-mode operation. In the region of the tuner finger, which is in the cavities, current flows in both the pi and the adjacent modes. This can be made of cooper so as to minimize losses. In the region above the cavities only current in the adjacent mode will flow (ideally). This can be made of a lossy material such as "cermet" or any high-loss ferrite, or metal-impregnated ceramic. Adjustment of relative pi-mode-to-adjacent-mode loss can be made by regulating the degree of insertion of fingers 13 and the relative dimensions of the lossy and lossless materials 13 and 21, respectively.

Figure 4:
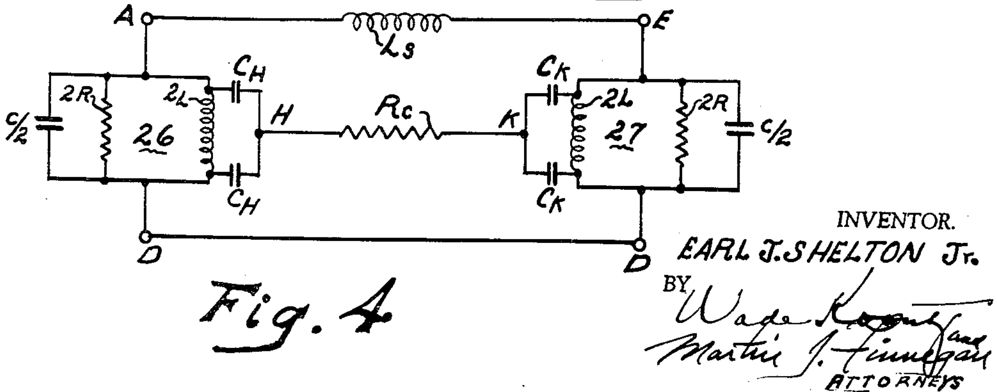
FIGS. 3 and 4 are circuit diagrams explanatory of the principles and mode of operation of the invention.

The equivalent circuit shown in FIG. 4 represents the electrical relationships. Referring to this FIG. 4 circuit, the two resistance-inductance-capacitance rectangles 26 and 27 illustrate the electrical values and ratios prevailing at related points along a region of the magnetron encompassed by three successive vanes 12, defining two adjacent resonant cavities. The capacitance values indicated at $C_H$ and $C_K$ represent the condition established by the adjacency of tuner surfaces 21 to the surfaces of vanes 12, in two adjacent cavities joined by the supporting structure 17 which introduces the R—L loading indicated at $R_C$ and $L_S$. (See also FIG. 3 for a further representation of this condition.) In the pi-mode, voltage $AD=ED$, and voltage $HD=KD$, hence no current flows in $R_C$ (assuming perfect symmetry in the design). In adjacent modes on the other hand, $AD\neq ED$, and $HD\neq KD$, hence there will be current flow (with resultant mode loading) in $R_C$.

Figure 6:
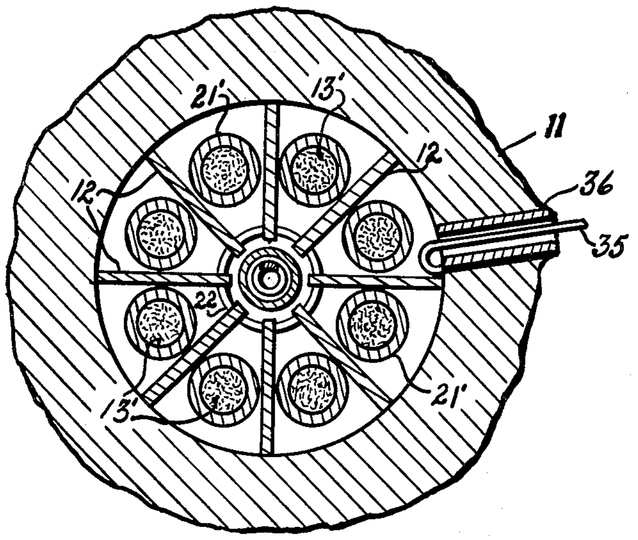
FIG. 6 is a transverse sectional view along line 6—6 of FIG. 5, with associated structure (not shown in FIG. 5) shown in relation thereto.
Figure 5:
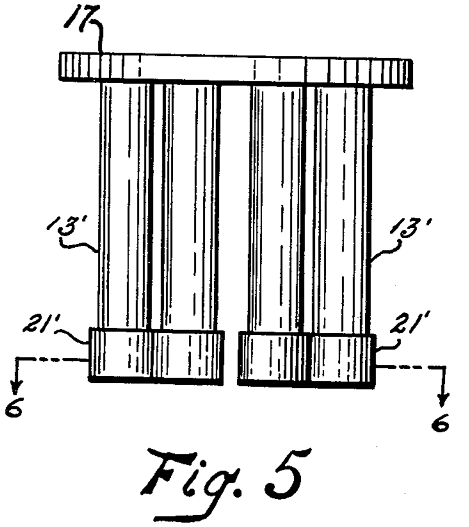
FIG. 5 is a view in elevation of a modified structure embodying the invention.

FIGS. 5 and 6 illustrate a modified tuning structure in which the tuning fingers 13', of high-loss, semi-conductive material, are of circular cross-section, with the lower extremities encased in circular caps 21' of highly conductive metal, which caps approach tangency with the surfaces of the vanes 12 and therefore perform the same function as the jackets 21 of the FIGS. 1–2 construction. The latter is theoretically more effective as an L—C tuner, due to the greater capacitance-coupled surface area and the exposed arcuate surfaces 13*a* as shown in FIG. 2; on the other hand, the FIGS. 5–6 construction is more practical for quantity production in relatively small-sized assemblies.

What I claim is:

In a magnetron, in combination with an anode block having a sealing bellows adjacent one interior end surface thereof and a plurality of cavity-defining walls intruding radially inward from said block, a corresponding plurality of frequency-controlling tuning elements of semi-conductive, high-loss material, said elements having their longitudinal axes disposed in parallelism about the axis of said block, a metallic covering of high conductivity secured to each of said tuning elements along the portions thereof which extend into the space embraced by said walls, and means including an annular conductive element suspended from said bellows and serving as a current flow path between successively positioned tuning elements during those periods of operation when there is a deviation from perfect balance of capacitance values throughout all cavities defined by said walls.

References Cited in the file of this patent

UNITED STATES PATENTS

| | | |
|---|---|---|
| 2,449,794 | Steele | Sept. 21, 1948 |
| 2,629,068 | Gottschalk et al. | Feb. 17, 1953 |
| 2,837,694 | Spencer | June 3, 1958 |